United States Patent
Dekker

(10) Patent No.: US 7,110,727 B2
(45) Date of Patent: Sep. 19, 2006

(54) METHODS FOR DETERMINING THE GAINS OF DIFFERENT CARRIERS, RADIO TRANSMISSION UNITS AND MODULES FOR SUCH UNITS

(75) Inventor: André Dekker, Oulu (FI)

(73) Assignee: Nokia Corporation, Espoo (FI)

( * ) Notice: Subject to any disclaimer, the term of this patent is extended or adjusted under 35 U.S.C. 154(b) by 477 days.

(21) Appl. No.: 10/297,876

(22) PCT Filed: Apr. 17, 2001

(86) PCT No.: PCT/EP01/04292

§ 371 (c)(1),
(2), (4) Date: Feb. 3, 2003

(87) PCT Pub. No.: WO02/084935

PCT Pub. Date: Oct. 24, 2002

(65) Prior Publication Data

US 2003/0153285 A1    Aug. 14, 2003

(51) Int. Cl.
*H01Q 11/12* (2006.01)
*H04B 1/04* (2006.01)
(52) U.S. Cl. .................. 455/91; 455/115.1; 455/125; 455/127.1; 455/127.2
(58) Field of Classification Search ........ 455/101–104, 455/118, 126, 127.1, 127.2, 127.4, 552.1, 455/553.1, 522, 115.1, 111.5, 127.3
See application file for complete search history.

(56) References Cited

U.S. PATENT DOCUMENTS

| | | | | |
|---|---|---|---|---|
| 5,697,072 A | * | 12/1997 | Shibata | 455/115.3 |
| 5,710,990 A | | 1/1998 | Long et al. | 455/103 |
| 5,732,334 A | * | 3/1998 | Miyake | 455/126 |
| 5,884,149 A | * | 3/1999 | Jaakola | 455/103 |
| 5,959,499 A | * | 9/1999 | Khan et al. | 330/149 |
| 6,108,527 A | * | 8/2000 | Urban et al. | 455/115.3 |
| 6,125,266 A | * | 9/2000 | Matero et al. | 455/126 |
| 6,151,509 A | * | 11/2000 | Chorey | 455/552.1 |
| 6,215,988 B1 | * | 4/2001 | Matero | 455/188.1 |

(Continued)

FOREIGN PATENT DOCUMENTS

EP        0 473 299 A2    3/1992

(Continued)

OTHER PUBLICATIONS

European Search Report Dated Jan. 17, 2005 in EPO application No. EP 04 02 4626.

(Continued)

*Primary Examiner*—Simon Nguyen
(74) *Attorney, Agent, or Firm*—Cohen, Pontani, Lieberman & Pavane

(57) ABSTRACT

The invention relates to methods for determining the separate radio frequency gains for carriers in a multi-carrier transmitter of a radio transmission unit of a radio communications system. In order to enable a simple and accurate estimation of the gains, it is proposed to determine the individual gains ($G_1$–$G_N$) of the different carriers mathematically from different sets of powers ($REF_1$–$REF_N$) at some point in each single carrier unit and the corresponding total output powers of the transmitter. Alternatively, the relation of the powers of the different carriers to each other is determined just before the carriers are combined to a single multi-carrier signal. This relation is used for determining the contribution of the different carriers to the transmission power of the multi-carrier signal and for therefrom determining the radio frequency gains for the different carriers. The invention equally relates to corresponding radio transmission units and modules of such radio transmission units.

65 Claims, 8 Drawing Sheets

U.S. PATENT DOCUMENTS

| | | | |
|---|---|---|---|
| 6,397,077 B1 * | 5/2002 | Jensen | 455/553.1 |
| 6,496,708 B1 * | 12/2002 | Chan et al. | 455/553.1 |
| 6,570,929 B1 * | 5/2003 | Eriksson | 375/260 |
| 6,633,766 B1 * | 10/2003 | van der Pol | 455/522 |
| 6,662,018 B1 * | 12/2003 | Kintis et al. | 455/522 |

FOREIGN PATENT DOCUMENTS

| | | |
|---|---|---|
| JP | 11-154927 | 6/1999 |
| JP | 2001-045389 | 2/2001 |
| WO | WO 00/01084 | 1/2000 |
| WO | WO 01/05057 A1 | 1/2001 |
| WO | WO 01/05111 A1 | 1/2001 |
| WO | WO 01/15335 A1 | 3/2001 |

OTHER PUBLICATIONS

European Office Action Dated Jun. 16, 2004 in EPO application No. 01 936 237.5.

Johansson M., Mattsson T. and Faulkner M.: "Linearization of Multi-Carrier Power Amplifiers", Proceedings of the Vehicular Technology Conference, New York, IEEE, US, May 18, 1993- May 20, 1993, vol. Conf. 43, pp. 684 to 687.

Translation of a Japanese Examination Report issued Jul. 25, 2005 in JP 2002-582543.

* cited by examiner

US 7,110,727 B2

METHODS FOR DETERMINING THE GAINS OF DIFFERENT CARRIERS, RADIO TRANSMISSION UNITS AND MODULES FOR SUCH UNITS

This is a national stage of PCT application No. PCT/EP01/04292, filed on Apr. 17, 2001. Priority is claimed on that application.

FIELD OF THE INVENTION

The invention relates to methods for determining the separate radio frequency gains for different carriers in a multi-carrier transmitter of a radio transmission unit of a radio communications system, the multi-carrier transmitter comprising means for modulating at least two different carriers with modulation signals, means for summing the signals output by the means for modulating, and a multi-carrier power amplifier for amplifying the summed signals for transmission. The invention moreover relates to radio transmission units, to modules of such radio transmission units and to radio communications network comprising such a radio transmission unit.

BACKGROUND OF THE INVENTION

In radio communications systems, it is known to employ cellular base station transmitters outputting signals with different carrier frequencies. In such transmitters, it is of great importance to be able to control the radio frequency gains and accordingly the output powers for each carrier accurately to predetermined levels.

In conventional base station transmitters, which comprise a separate transmitter for each carrier, it is possible to determine the radio frequency gain for each carrier independently from the gain of the other carriers.

For illustration, FIG. 1 shows a block diagram of such a conventional base station transmitter based on RF (radio frequency) IQ (in-phase and quadrature) modulators. The base station transmitter comprises N single-carrier transmitters, of which the first one and the last one are shown. Signs of components or of values of the transmitters having an index 1 or N indicate that they are assigned to the $1^{st}$ or $N^{th}$ single-carrier transmitter.

Each of the N single-carrier transmitters includes a baseband modulator 1 connected at its input to elements (not shown) of a communications network supplying data symbols and at its outputs to two digital-to-analogue converters 3, 4. The digital-to-analogue converters 3, 4 are connected to inputs of an RF modulator 5. An additional input of the RF modulator 5 is connected to a local oscillator (LO) 6, while the output of the RF modulator 5 is connected to an input of a variable gain RF amplifier 7. The output of the RF amplifier 7 is connected to a single carrier power amplifier (SCPA) 8 and the output of the SCPA 8 of each single-carrier transmitter is connected via a common summation unit 10 to a transmit antenna 11. The output of the SCPA 8 is further connected to an input of a power detection and control unit 9 belonging to the respective single carrier transmitter.

Equally, the baseband modulator 1 is connected via a baseband power detection unit 2 to an input of the power detection and control unit 9. The output of the power detection and control unit 9 forms a gain controlling input of the RF amplifier 7. In practice, there can be included more upconversion stages and amplifiers, and filters may be included as well.

The baseband modulators 1 of the N single-carrier transmitters receive symbols from the network that are to be transmitted via the transmit antenna 11 over the air interface. The baseband modulator 1 of the respective transmitter generates a digitised signal trajectory in the complex plain in IQ format and forwards the signals to the two digital-to-analogue converters (DAC) 3, 4. Each of the digital IQ signals is converted into an analogue signal I, Q by one of the two digital-to-analogue converters 3, 4 and then fed to the RF modulator 5. In the RF modulator 5, both signals I, Q are modulated onto one of N carriers determined by the local oscillator 6 associated to the respective single-carrier transmitter. The output signal of the RF modulator 5 is then amplified by the RF amplifier 7 according to the gain set according to a gain control signal $GC_1$, $GC_N$ applied to the respective RF amplifier 7, and fed to the SCPA 8. The powers output by the N single-carrier transmitters are combined at the output of the SCPA 8 by the summation unit 10 for transmission by the transmit antenna 11.

The power $REF_1$, $REF_N$ of the output signal of each baseband modulator 1 is computed in the associated baseband power detection unit 2 and forwarded to the respective power detection and control unit 9. Equally, the output of each of the SCPAs 8 is fed additionally to the respective power detection and control unit 9, where the output carrier power is measured and compared to the output power provided by the baseband power detection unit 2 of the corresponding single-carrier transmitter. The quotient of these powers constitutes the gain of the respective RF path, $G_1$, $G_N$. If the measured gain $G_1$, $G_N$ on the RF path of one of the N single-carrier transmitters deviates from the desired value, the responsible power detection and control unit 9 changes the gain control signal $GC_1$ $GC_N$ applied to the respective RF amplifier 7 for this path in order to steer the gain $G_1$, $G_N$ into the direction of the desired gain.

Equally, an independent power control of the different carriers is possible in another embodiment of a conventional base station transmitter shown in FIG. 2. The base station transmitter corresponds to the one of FIG. 1, except that each baseband modulator 1 is now connected to the respective RF amplifier 7 via a digital upconverter 12 and a single digital-to-analogue converter 14. An input of the digital upconverter 12 is further connected to a numerically controlled oscillator (NCO) 13. To the components of the single carrier transmitters corresponding to the components of the single carrier transmitters of FIG. 1, the same reference signs were assigned.

In contrast to the example of FIG. 1, here the conversion of the digital IQ signals output by one of the baseband modulators 1 to a modulated RF signal is carried out in the digital domain by the respective digital upconverter 12, the frequency of which is determined by the NCO 13 associated to the digital upconverter 12. The output of the digital upconverter 12 is then converted to an analogue signal by the single digital-to-analogue converter 14. Presently, digital-to-analogue converters 14 are not capable of generating high quality signals at GHz frequencies. Therefore, the architecture of FIG. 2 has in practice at least one extra analogue upconversion stage. However, for the sake of simplicity this is not shown in the diagram.

Since the power output by the baseband modulators 1 and the output of the SCPAs 8 correspond to the outputs of baseband modulators 1 and SCPAs 8 of FIG. 1 and are fed to the power detection and control units 9 as in the example of FIG. 1, the RF gain for each carrier can be determined independently as described with reference to FIG. 1. Again, gain control signals $GC_1$, $GC_N$ are provided by the power detection and control units 9 according to the determined gains $G_1$, $G_N$ and supplied to the respective RF amplifier 7 in order to adjust the gain for each carrier to a predetermined value.

The base station is required to control the output power used for each carrier accurately to a predetermined value. At maximum output power, the GSM (Global System for Mobile communication) and WCDMA (Wideband Code Division Multiple Access) standards demand an accuracy of better than ±2 dB per carrier. In order to achieve this accuracy reliably, the power measurement accuracy should in practice even be better than ±1 dB.

If a single carrier power amplifier is used for each carrier, this accuracy can be achieved e.g. with one of the architectures described with reference to FIGS. 1 and 2, since an access to the separate output powers of each carrier is given. Combining the carriers only at the single carrier power amplifier outputs, though, has several drawbacks. Output power is lost and changing the number of carriers in a base station takes much effort. Future base station will therefore combine the carriers already before power amplification or even earlier. The carriers are then power amplified by a single multi-carrier power amplifier. This, however, causes problems for the power control, since the individual power of the power amplified carriers cannot be accessed any more but only the multi-carrier signal output by the single multi-carrier power amplifier. Therefore, an accurate estimation of the individual carrier RF gains becomes more complicated.

In a known approach, it is simply assumed that the RF gain is equal for all carriers. Accordingly, the total output power is measured and divided by the sum of the output powers of the baseband modulators. This quotient constitutes the total gain. If the measured gain deviates from the desired value, the gain control signals for each RF amplifier are changed equally in order to adjust the gain to the right value. The drawback of this method is that there is no way to ensure that the RF gains for the different carriers are indeed all equal and will stay equal for all values of the common gain control signal, under all environmental conditions and during the whole lifetime of the base station. The relation of the gains to each other can be verified only during the assembly of the base station and, after putting into operation, by a site visit to check.

In an alternative approach, it was proposed to use a channeliser to separate the individual carriers from each other at the output of the single multi-carrier power amplifier. The powers of the separated carriers can then be measured and compared to the powers of the baseband signals. By division of the respective pair of values for one carrier, the gain for the individual carriers is found. If one of the gains deviates from the predetermined gain for this carrier, the gain can be adjusted individually by a corresponding gain control signal. The disadvantage of this method is that a channeliser is needed. The required selectivity is such that its implementation must be at an intermediate frequency or baseband. Therefore, one or two down-conversion stages are needed, which increases complexity and adds uncertainty to the measurement. In practice, the power measurement circuitry moreover needs some automatic calibration circuit to maintain its accuracy. Therefore, the power control becomes rather expensive and space consuming. Moreover, in case frequency hopping transmitters are used, like e.g. in the GSM, also the channelisers have to be suited for frequency hopping, which makes the construction even more complex.

SUMMARY OF THE INVENTION

It is an object of the invention to provide a method, a radio transmission unit, a module for a radio transmission unit and a radio communications network comprising such a radio transmission unit which enable a simple determination of separate radio frequency gains for different carriers in a multi-carrier transmitter of a radio transmission unit of a radio communications system.

This object is reached in a first alternative of the invention on the one hand with a method for determining the separate radio frequency gains for different carriers in a multi-carrier transmitter of a radio transmission unit of a radio communications system, the multi-carrier transmitter comprising means for modulating at least two different carriers with modulation signals, means for summing the modulated carriers output by the means for modulating and a multi-carrier power amplifier for amplifying the summed carriers for transmission, wherein the power of the summed carriers output by the multi-carrier power amplifier is determined for at least as many different sets of powers of signals modulated onto the different carriers as there are carriers; and wherein the radio frequency gain between the input of the signals to the means for modulating and the output of the multi-carrier power amplifier is determined for each carrier by evaluating the sets of powers of the signals used for modulation and the corresponding powers of the summed carriers output by the multi-carrier power amplifier mathematically.

For a variation of this method of the first alternative of the invention, the multi-carrier transmitter comprises for each carrier a digital-to-analogue converter for converting digital modulated carriers into analogue modulated carriers before feeding them to the means for summing the modulated carriers. Such a converter can also be comprised in the multi-carrier for the first presented method. But in the variation, the power of the summed carriers output by the multi-carrier power amplifier is determined for at least as many different sets of powers of signals input to the digital-to-analogue converters as there are carriers. The radio frequency gain between the input of the digital-to-analogue converter and the output of the multi-carrier power amplifier is then determined for each carrier by evaluating the sets of powers of the signals input to the digital-to-analogue converters and the corresponding powers of the summed carriers output by the multi-carrier power amplifier mathematically.

On the other hand, the object is reached in the first alternative of the invention with a radio transmission unit for a radio communications network with a multi-carrier transmitter comprising means for modulating at least two different carriers with modulation signals, means for summing the modulated carriers output by the means for modulating, and a multi-carrier power amplifier for amplifying the summed carriers for transmission, and with power detection and control means receiving as input at least as many sets of powers of signals used for modulating the carriers as there are carriers provided by the means for modulating, and for each set the corresponding power of the summed carriers output by the multi-carrier power amplifier, the power detection and control means being suited to determine out of the received powers the radio frequency gain in the multi-carrier transmitter for each carrier mathematically.

In a variation of the radio transmission unit corresponding to the variation of the method, the multi-carrier transmitter of the radio transmission unit comprises in addition digital-to-analogue converters for converting each of the modulated carriers, which are digital modulated carriers, into analogue modulated carriers, the means for summing the analogue modulated carriers output by the digital-to-analogue converters. Such digital-to-analogue converters can also be comprised in the first proposed radio transmission unit. In contrast to the first proposed radio transmission unit, in the variation, the power detection and control means receive as input at least as many sets of powers of the signals input to the digital-to-analogue converters as there are carriers, and for each set the corresponding power of the summed carriers output by the multi-carrier power amplifier. Like in the first presented radio transmission unit, the power detection and control means are suited to determine out of the received powers the radio frequency gain in the multi-carrier transmitter for each carrier mathematically.

The object of the invention is moreover reached in the first alternative with a module for a radio transmission unit in a radio communications system comprising the power detection and control unit of a radio transmission unit in one of the presented variations.

The methods, the radio transmission units and the modules of the first alternative of the invention proceed from the idea that the total power of the summed carriers output by the multi-carrier power amplifier can be described mathematically with the powers of predetermined signals in the single carrier units as variable but known coefficients and the total RF gain for each carrier as unknown values. The predetermined signals can be either signals input to the means for modulating the different carriers, or signals input to digital-to-analogue converters included in the single carrier units. The powers of the signals in the single carrier units can be determined easily and each variation in these powers leads to a corresponding variation in the total output power. A plurality of sets of different powers of the signals input to the means for modulating or to the digital-to-analogue converters respectively and the corresponding total output power deliver a plurality of equations that can be solved mathematically in case at least as many sets are supplied as carriers are present. The proposed methods, radio transmission units and modules according to the first aspect of the invention therefore enable to determine the gains of the individual carriers without using a channeliser, but nevertheless accurately. Avoiding channelisers means that the implementation can be simpler and there are less problems in frequency hopping.

The object of the invention is equally reached in a second alternative of the invention by a method for determining the separate radio frequency gains for different carriers in a multi-carrier transmitter of a radio transmission unit of a radio communications system, the multi-carrier transmitter comprising means for modulating at least two different carriers with modulation signals, means for summing the modulated carriers output by the means for modulating, and a multi-carrier power amplifier for amplifying the summed carriers for transmission, wherein the power of the modulated carriers input to the means for summing is determined separately for each carrier, and wherein the distribution of the powers of the modulated carriers input to the means for summing is evaluated in order to determine the contribution of the different carriers to the power of the summed carriers output by the multi-carrier power amplifier for determining the radio frequency gains for the different carriers.

In the second alternative of the invention, the object of the invention is also reached by a corresponding radio transmission unit for a radio communications network with a multi-carrier transmitter comprising means for modulating at least two different carriers with modulation signals, means for summing the modulated carriers output by the means for modulating, and a multi-carrier power amplifier for amplifying the summed carriers for transmission, and with gain computation and control means receiving as input values the total power of the summed carriers output by the multi-carrier power amplifier, the powers of the modulated carriers fed by the means for modulating to the means for summing, and the powers of the signals used for modulating the carriers, the gain computation and control means being suited to evaluate the distribution of the powers of the modulated carriers input to the means for summing for determining the contribution of the different carriers to the total power of the summed carriers output by the multi-carrier power amplifier, for determining the radio frequency gains for the different carriers.

In a variation of the radio transmission unit for the second alternative of the invention, the multi-carrier transmitter of the radio transmission unit comprises in addition digital-to-analogue converters for converting each of the modulated carriers, which are digital modulated carriers, into analogue modulated carriers, the means for summing the analogue modulated carriers output by the digital-to-analogue converters. Such digital-to-analogue converters can also be comprised in the first presented radio transmission unit and in the radio transmission unit used for the presented method of the second alternative of the invention. The gain computation and control means receive in the variation as input values the power of the summed carriers output by the-multi-carrier power amplifier, for each carrier separately the power of the modulated carriers fed by the digital-to-analogue converters to the means for summing, and the powers of the signals input to the digital-to-analogue converters. The gain computation and control means are then suited to evaluate the distribution of the powers of the signals input to the means for summing over the different carriers for determining the contribution of the different carriers to the power of the summed carriers output by the multi-carrier power amplifier for determining the radio frequency gains for the different carriers.

Corresponding to these variations of the radio transmission unit, the gain can be determined in the last presented method based on the power of the signals used for modulating the respective carrier or based on the signals input to the respective digital-to-analogue converter.

Finally, the object of the invention is reached for the second alternative of the invention with a corresponding module for such radio transmission units comprising such a gain computation and control means and/or means for detecting for each carrier separately the powers of the modulated carriers fed to the means for summing.

The method, radio transmission units and modules according to the second alternative of the invention are based on the fact that multi-carrier power amplifiers tend to have by design a very accurate gain.

The input powers to a multi-carrier power amplifier are quite small, typically less than 10 dBm rms (root mean square). In case a transmitter is not transmitting at maximum power level, the power may even be significantly smaller, e.g. 0 to −10 dBm. REF detectors operating at this kind of low input levels are not particularly accurate and temperature stable. Therefore it is difficult to perform an accurate carrier power measurement at the input of a multi-carrier power amplifier. In principle, it would be possible to generate higher input signals to the multi-carrier power amplifier, but in case of e.g. WCDMA, this demands extreme linearity from the driver amplifier. This means, that it is not advisable to use simply the measured input powers to the multi-carrier power amplifier, multiplied with the respective gain in the multi-carrier power amplifier for each carrier, for calculating the total output power for each carrier.

According to the second proposed alternative of the invention, in contrast, the single-carrier powers are determined before summing of the modulated carriers to a multi-carrier signal, but only used relatively to each other. Even though it is not possible to determine the powers of the modulated carriers input to the multi-carrier power amplifier accurately, it is possible to mutually track the powers accurately. This makes it possible to compare the relative strengths of the individual carrier powers at the output of the low-power part of the multi-carrier transmitter. The determined relative strengths can then be used to distribute the total power or the total gain determined for the summed carriers to the individual carriers. The gains for the different carriers in the multi-carrier power amplifier can be taken into account for this distribution. Thus, an accurate individual gain value for each carrier can be obtained.

The second proposed alternative of the invention has several advantages compared to the first proposed alternative. There is no need to solve a system of equations and the gain information can be obtained directly after a single measurement, so there is no need to wait for a series of measurements. Possibly, even less accuracy is needed in the measurement of the multi-carrier signal. Finally, the second alternative of the invention is also suited for fixed carrier powers. The advantage of the first proposed alternative, in contrast, is that less RF power detectors are needed. Moreover, in the second alternative, the frequency response of the MCPA, apart from a constant, has to be known reliably a priory.

Both alternatives according to the invention use mathematical evaluations of determined powers in order to allow for a simple and accurate determination of the individual RF gain of different carriers in a multi-carrier radio transmission unit.

It has to be noted that in the respective variation of both alternatives, in which the gain is determined based on the power of signals input to the digital-to-analogue converters, the expression "input to the digital-to-analogue converters" does not necessarily refer to a direct input to these converters. Rather, the input to any component of the different single carrier units can constitute this input to the digital-to-analogue converters to which input the carriers ate fed while being already modulated but still in the digital domain.

The radio transmission units of the invention can be in particular base stations, but equally any other transmission units using multi-carrier signals for transmission.

The object of the invention is also reached with a radio communications network comprising a radio transmission unit of either of the alternatives of the invention.

Preferred embodiments of the invention become apparent from the subclaims.

In most radio transmission units, the power of the signals provided for RF modulation can be varied in time slots in order to adapt the transmitted power to the needs of the mobile. More specifically, in TDMA systems, the power of each carrier can be varied in time slots. In CDMA systems, in contrast, the power of the user codes can be varied in user specific time slots, the time slots of different users not being synchronised to each other and each carrier serving a plurality of users. Accordingly, in the carrier power of a CDMA signal, the time slots cannot be recognised any more. The possibility of varying the transmission power reduces the interference within the network and to other networks.

It is proposed for the first alternative of the invention employed in a TDMA system that the power of the signals input to the means for modulating or to the digital-to-analogue converters corresponds to the power of signals of one carrier time slot, in particular the average of the power of one carrier time slot. That means that used measurement time slots are advantageously synchronised with the carrier time slots. But also in TDMA systems, a time slot for measurement does not necessarily have to coincide with a time slot for power control. The only requirement for the measurement time slots is that they have to be long enough to allow a sufficiently accurate power measurement and a mitigation of the effects of possible small misalignments between the slots for power of signals input to the means for modulating and the slots for the power of the RF output signal of the multi-carrier power amplifier.

Since in a CDMA system, the power seems to vary in a random way, there is no need for a synchronisation in such a system, even though the measurements are preferably also carried out in time slots.

The power values of several measurement time slots can be stored in the first alternative with both systems in registers and used as input to a mathematical algorithm.

On the one hand, the variations in power employed during regular traffic can be used in the first proposed alternative for forming continuously sets of powers and for determining the radio frequency gain based on those sets continuously. On the other hand, the power of the signals can be varied intentionally, in particular during times of low traffic. In the latter case, the RF gains should be so stable that they do not change significantly over a time span of several hours. During quiet hours, the carrier powers can be manipulated in e.g. the following ways: In a CDMA system it is possible to increase temporarily the power of a carrier by adding dummy traffic channels. In a TDMA system it is possible to arrange the traffic in such a way that all carriers will have in turn empty time slots. In that way a variation between zero (or minimum) power and typical operating power is created. In the GSM system the BCCH carrier presents a problem, since all its time slots should be at equal power. However, if the transmitters have frequency hopping capability it is possible to redirect the BCCH carrier to another RF path. In this way it is also possible to arrange zero or minimum transmit power in the transmitter that normally transmits the BCCH.

In order to be able to determine the gains of N different carriers, in principle, N linear equations with the N gains as N unknowns in each equation are sufficient in the first alternative of the invention. But in practice, especially if the carrier powers are randomly varying according to the needs of the radio network, there is no guarantee that the system of equations is well conditioned. Also the measured output power may contain some errors, even though this may not lead to large errors in the computed RF gains. In a preferred embodiment of the first alternative of the invention, therefore more than N sets are determined and a maximum likelihood method is used to find the gains that give the best fit to the equations.

In the second alternative of the invention, the measurement of the powers of the single carriers before they are summed is best performed by one or more dedicated active components. If each carrier is processed by its own active component(s), the components for the different carriers should be matched. To this end, corresponding components can e.g. originate from the same area of the same the so that they have equal electrical properties, and they should be in close thermal contract, in order to ensure a good accuracy in the relation of the determined powers. The at least one dedicated active component can be in particular a single RF integrated circuit. Still, other active components, like diodes, can be used as well for realising a detector. In another preferred embodiment, means for detecting the power of all carriers are realised in a single radio frequency integrated circuit.

In the second alternative of the invention, the gain for the different carriers can be determined by first distributing the power of the summed carriers output by the multi-carrier power amplifier to the different carriers according to the relation of the powers of the different carriers input to the multi-carrier power amplifier to each other. The individual gains can then be determined by dividing the determined portion of the output power assigned to one carrier by the power of the respective signal input to the means for modulating this carrier or input to the digital-to-analogue converter of this carrier unit, respectively. It should be considered that the gain in the MCPA may be different for the different carriers.

In both alternatives of the invention, the algorithm used for determining the RF gains of the different carriers can be further refined in several ways. For instance, the output signal of an RF power detector used for detecting the power output by the multi-carrier power amplifier may be some non-linear function, constituting the detector characteristic, of the real output power of the multi-carrier power amplifier. This detector characteristic can be linearised around some operating point in order to make the equation set linear again. Even though the linearisation can take place in the detector itself, it is preferably carried out in numerical algorithms.

In a preferred embodiment of both alternatives of the invention in which the radio frequency gains of the different carriers is determined based on signals used for modulating the carriers, baseband signals provided by a baseband modulator are supplied to the means for modulating the carriers as such signals used for modulating. In this case, the baseband powers can be computed numerically inside the baseband modulator or by a separate processor operating on the digital baseband output of the baseband modulator.

When determining in either of the two alternative of the invention the radio frequency gain of the different carriers based on the power of signals input to digital-to-analogue converters, the respective power does not necessarily have to be measured at the input of the respective digital-to-analogue converter. In NCO modulator architectures, like the one described with reference to FIG. 2, it is possible to measure the powers of the signals input to the digital-to-analogue converters inside of the digital upconverters preceding the digital-to-analogue converters, or at the output of such digital upconverters. The power of a signal input to a digital-to-analogue converter can also be computed as the power of a complex modulating signal times a multiplication factor at the output of such a digital upconverter.

Measuring the output power of the multi-carrier power amplifier can be carried out in both alternatives of the invention by an RF integrated circuit, but this may not result in very accurate measurements. Instead, the radio frequency signal output by the multi-carrier power amplifier is preferably first downconverted. The downconverted signal is then converted into the digital domain, in which the power is determined. Most MCPAs already have a downconversion and ADC block inside for the purpose of monitoring and controlling linearisation performance. This block can be used advantageously as basis for adding digital rms detection to the MCPA that can be used for detecting the power of the signal output by the multi-carrier power amplifier.

In a further preferred embodiment of both alternatives of the invention, the RF gain estimation is implemented in software. Additionally, the gain control and, in the first alternative, the storage of measured values can be implemented in software.

In both alternatives of the invention, the determined RF gains are preferably compared with predetermined gain values for each carrier, so that the gain for each carrier can be adjusted accordingly.

The radio transmission units of both alternatives can be used with various base station architectures. For example, the means for modulating can be realised with separate RF IQ modulation or NCO modulation paths for each carrier as described with reference to FIGS. 1 and 2 respectively from the output of the baseband modulator to the output of the RF amplifier, the signals used for modulating the carriers being provided by a baseband modulator as described with reference to FIGS. 1 and 2. In both alternatives, additional components may be arranged between the means for modulating, summing and the power detection and control means or the gain estimation and control means.

It is possible to combine one of the proposed methods with the method mentioned in the background of the invention, in which the gain is always adjusted equally for all carriers. During normal operation, the power control works in said conventional way as described above. As already mentioned, this power control has the disadvantage that it relies on the equality of the individual RF gains which can not be guaranteed. Therefore, at certain times, preferably during low traffic hours, the carrier gains are determined with one of the methods of the invention with little error. These gains are used for checking if the RF gains for the individual carriers are still equal. If this is not the case, some automatic and individual adjustments can be made to the gains of the carriers.

The methods, radio transmission units and modules according to the invention can be employed in particular, though not exclusively, with GSM and WCDMA.

BRIEF DESCRIPTION OF THE FIGURES

In the following, the invention is explained in more detail with reference to drawings, of which

DETAILED DESCRIPTION OF THE INVENTION

Figure 1:
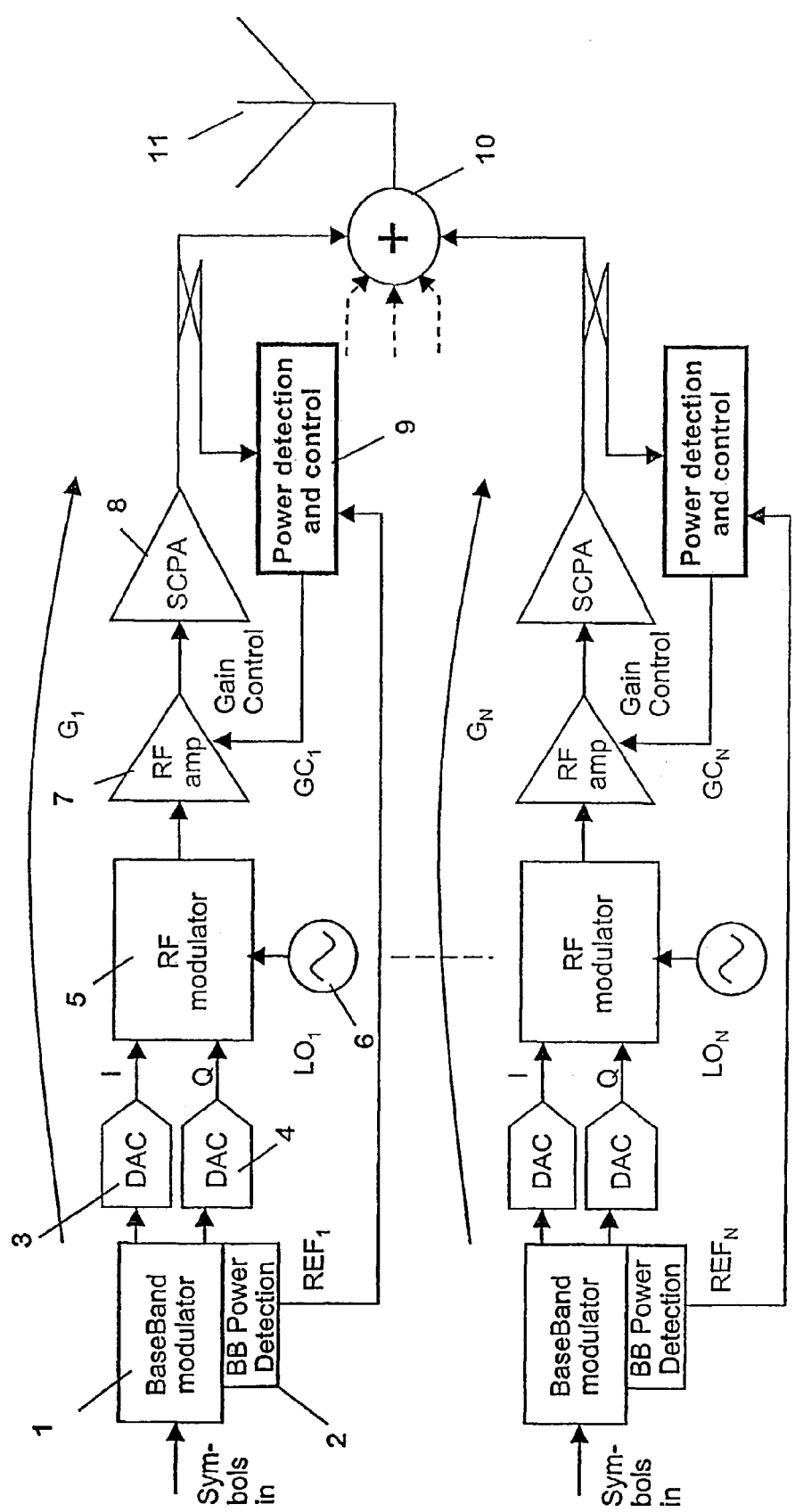
FIG. 1 shows a block diagram of a conventional base station transmitter based on RF IQ modulation.
Figure 2:
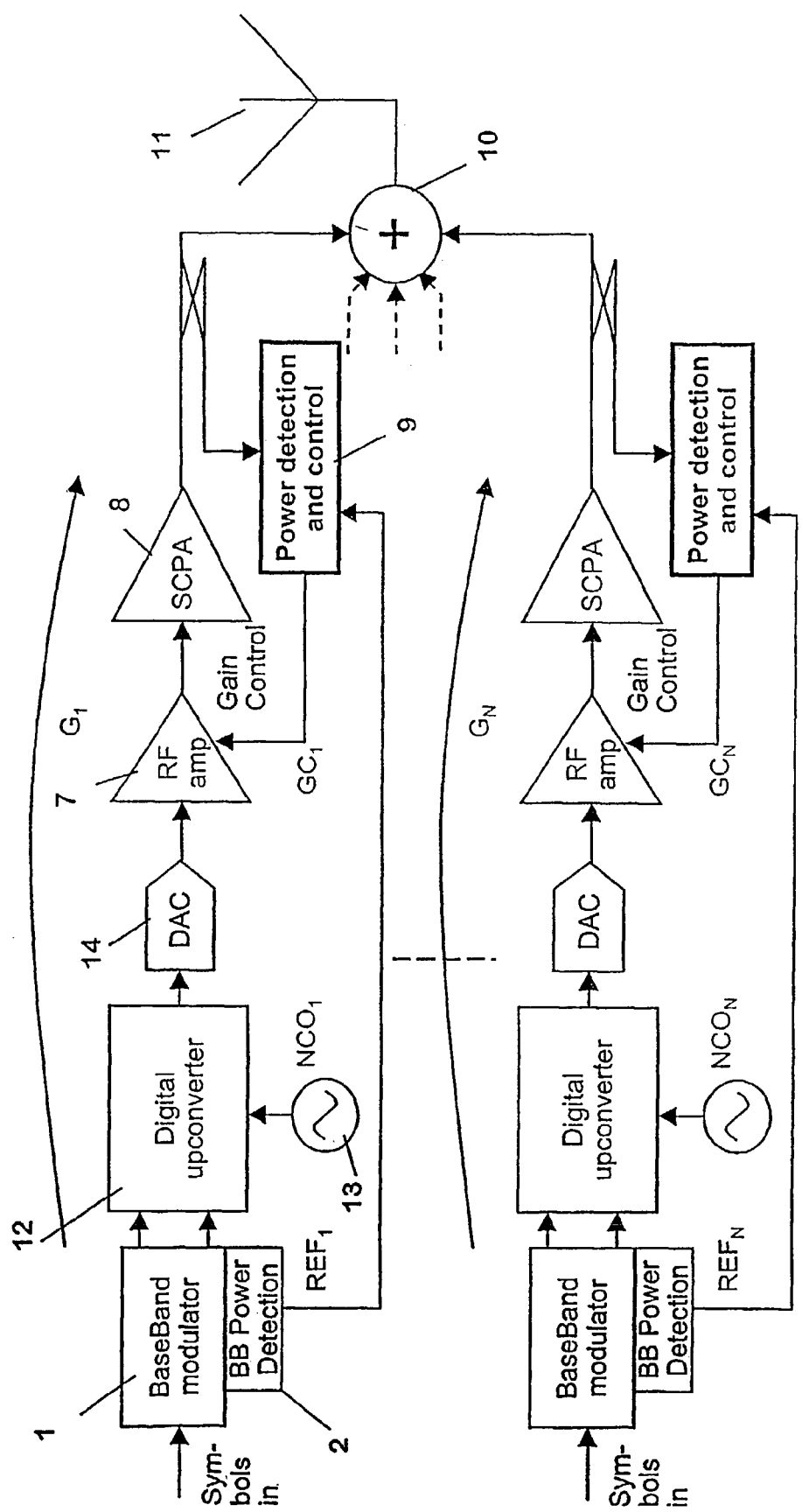
FIG. 2 shows a block diagram of a conventional base station transmitter based on NCO modulation.

FIGS. 1 and 2 have already described with reference to the background of the invention.

Figure 3:
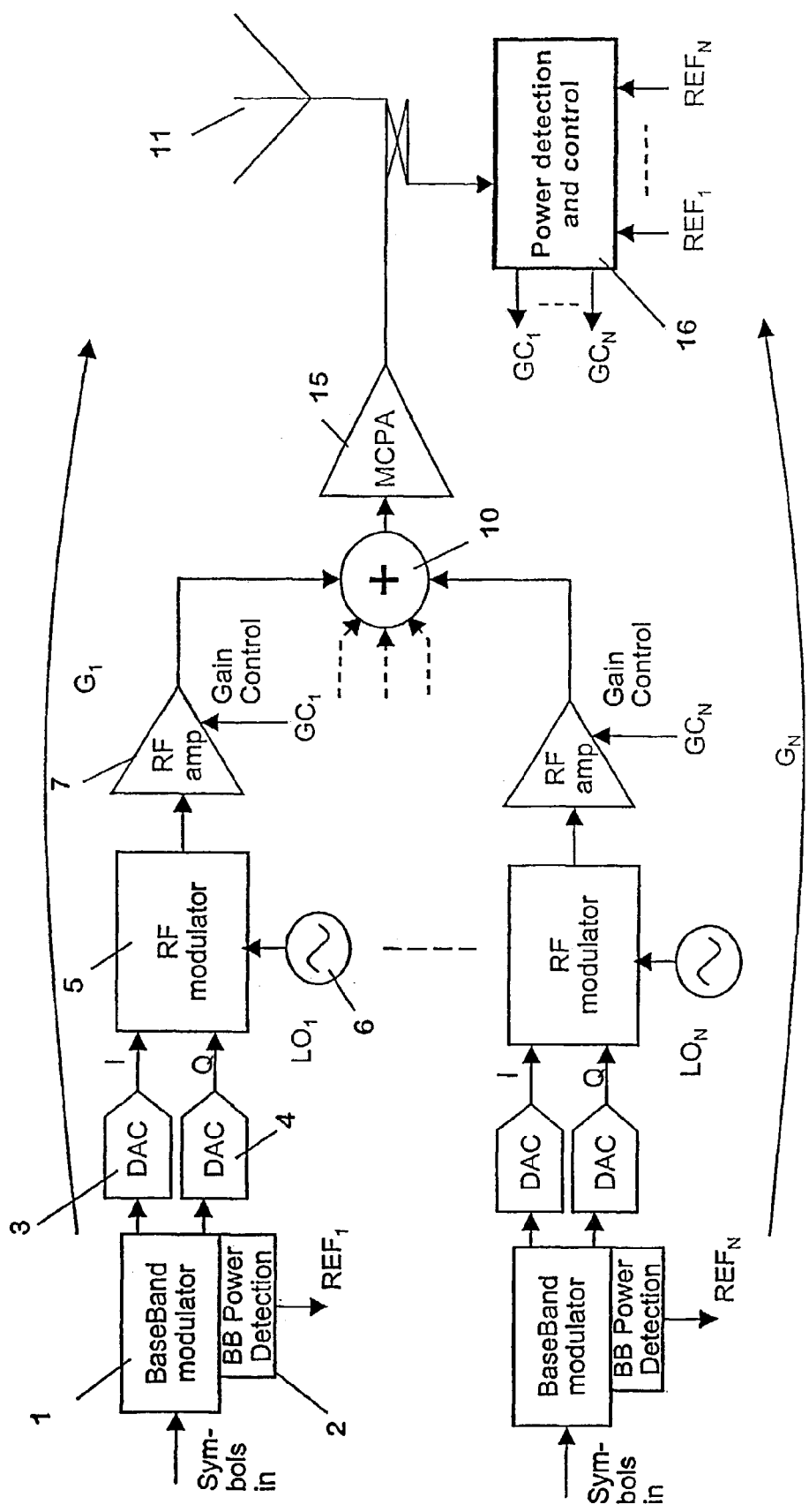
FIG. 3 shows a block diagram of a multi-carrier base station transmitter based on RF IQ modulation employed for the first alternative of the invention.
Figure 4:
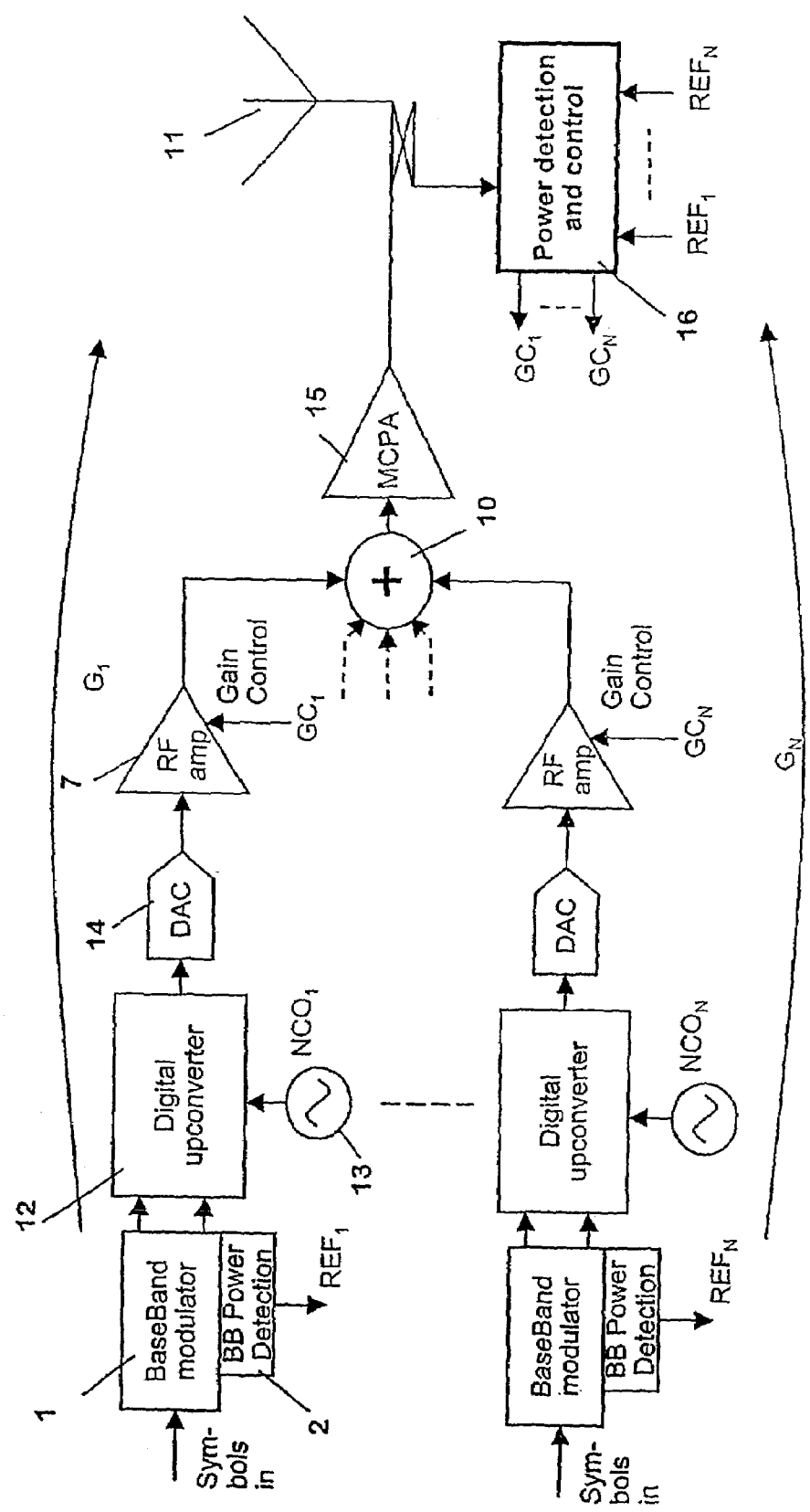
FIG. 4 shows a block diagram of a multi-carrier base station transmitter based on NCO modulation employed for the first alternative of the invention.

FIGS. 3 and 4 each show a block diagrams of a different embodiment of multi-carrier base station transmitters in which the first alternative of the invention can be employed advantageously.

FIG. 3 is a multi-carrier base station transmitter based on RF IQ modulation like the conventional base station transmitter shown in FIG. 1. It equally comprises for each of N carriers a baseband modulator 1 connected via two digital-to-analogue converters 3, 4 and an RF modulator 5 to a gain variable radio amplifier 7. Each baseband modulator 1 is moreover connected to a baseband power detection unit 2 and each RF modulator 5 to a local oscillator (LO) 6. In contrast to FIG. 1, however, the output of each RF amplifier 7 is not connected to a dedicated SCPA but via a summation unit 10 to a single multi-carrier power amplifier (MCPA) 15. The output of the MCPA 15 is connected to a transmit antenna 11 and to a common power detection and control unit 16. The power detection and control unit 16 is connected at further inputs to the outputs of the baseband power detection units 2 and at outputs to the gain control inputs of the RF amplifiers 7.

FIG. 4 is a multi-carrier base station transmitter based on NCO modulation like the conventional base station transmitter shown in FIG. 2. It equally comprises for each of N carriers a baseband modulator 1 connected via a digital upconverter 12 and a digital-to-analogue converter 14 to an RF amplifier 7. Each baseband modulator 1 is moreover connected to a baseband power detection unit 2 and each digital upconverter 12 to an NCO 13. In contrast to FIG. 2 and equal to FIG. 3, the output of each RF amplifier 7 is connected via a summation unit 10 to a common MCPA 15. The output of the MCPA 15 is connected to the transmit antenna 11 and to a common power detection and control unit 16. Further inputs and outputs of the power detection and control unit 16 are connected to the baseband power detection units 2 and the RF amplifiers 7 as in the base station transmitter of FIG. 3 respectively.

In the multi-carrier base station transmitters of FIGS. 3 and 4, symbols fed to the baseband modulators 1 are processed as described with reference to FIGS. 1 and 2 respectively, until they leave the RF amplifiers 7. In both examples, the output signals of the RF amplifiers 7 are then summed in the summation unit 10 and fed as a multi-carrier signal to the MCPA 15, which amplifies the received signal.

The power detection and control unit 16 arranged at the output of the MCPA 15 receives as input the total power output by the MCPA 15 and the output powers of the digital baseband modulators 1 via the baseband power detection unit 2. To this end, the summed RF signal is on the one hand forwarded after power amplification to the transmit antenna 11 for transmission and on the other hand downconverted and converted to the digital domain inside of the MCPA 15, in order to enable a digital rms detection of the output power. Alternatively, there could be an RF detector or a downconversion path and a digitisation outside of the MCPA. Each baseband power detection unit 2 forms a processor operating on the digital baseband output of the baseband modulator 1 to which it is connected in order to be able to provide the power detection and control unit 16 with the power value output by the respective baseband modulator 1. According to the first method of the invention, the power detection and control unit 16 is able to set the gain control signal $GC_1$ to $GC_N$ for each carrier individually based on this power information as explained in the following with reference to FIG. 5.

Figure 5:
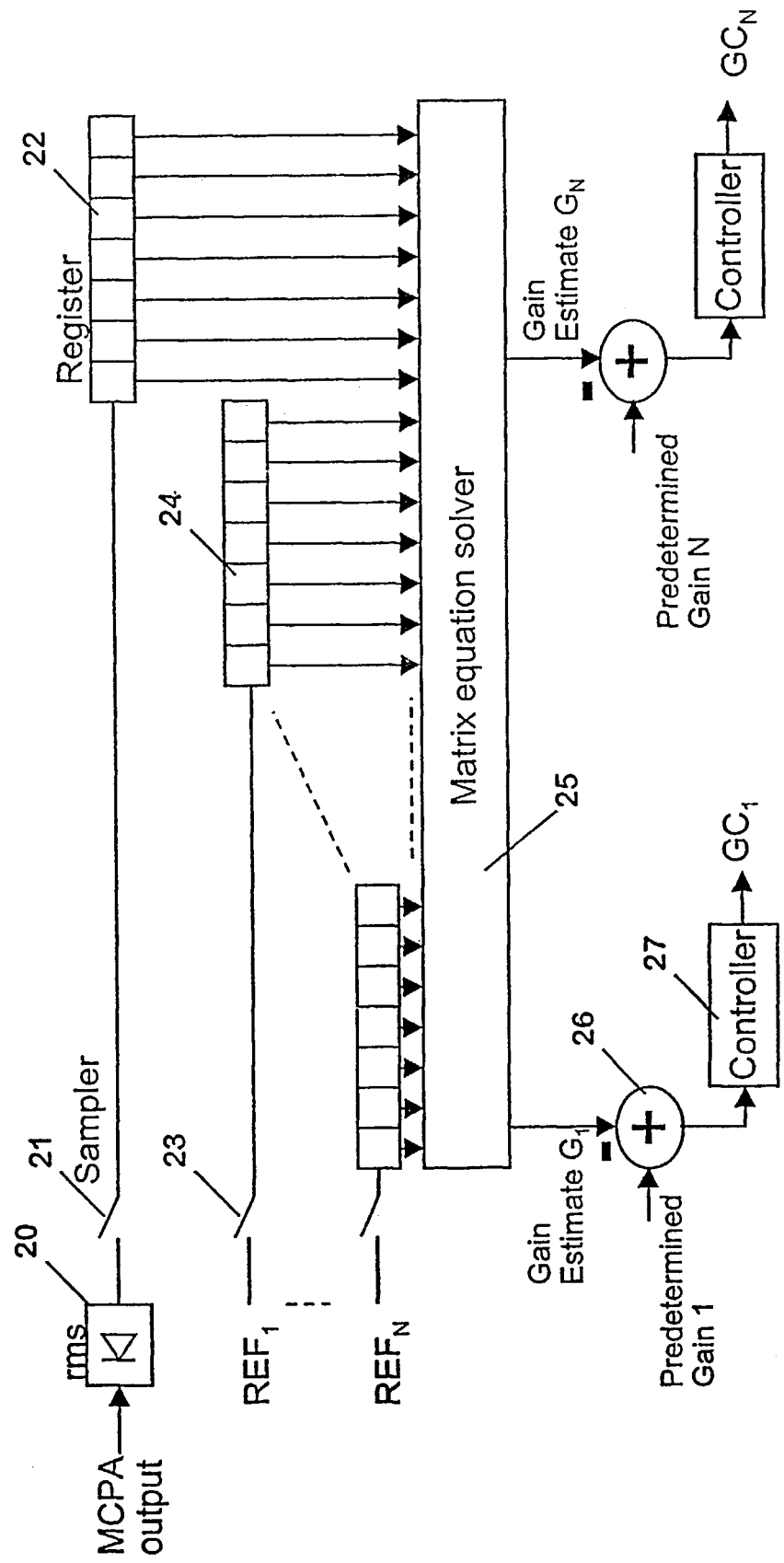
FIG. 5 illustrates the first method according to the invention employed in a base station transmitter of FIG. 4 or 5.

FIG. 5 illustrates the basic principle of the processing in the power detection and control unit 16 according to the first method of the invention employed for a multi-carrier base station transmitter as depicted in FIG. 3 or 4.

An rms power detector 20 is connected on the one hand to the output of the MCPA 15 of the employed base station transmitter and on the other hand via a sampler 21 to a first register 22. Equally, the output of each baseband power detection unit 2 of the base station transmitter is connected via a dedicated sampler 23 to a dedicated further register 24 providing storage room for a plurality of values. Each register 22, 24 has for each stored value a separate output to a device 25 that is able to solve matrix equations. The device 25 has N outputs, each connected via a separate summation element 26 to a separate controller 27. Each summation element 26 has a further input to which a predetermined gain value is provided. The output of each controller 26 is connected to the gain control input of one of the RF amplifiers 7. Although presented as a hardware block diagram, most of the implementation is advantageously realised in software in the power detection and control unit 16.

Symbols that are to be transmitted by the base station transmitter over the air interface are fed to the baseband modulators 1. The output powers of the baseband modulators 1 are varied in several measurement time slots, the respective rms power value $REF_1$ to $REF_N$ being determined in the baseband power detection unit 2 and forwarded to the respective sampler 23 of the power detection and control unit 16. Each sampler 23 averages the received baseband power over one measurement time slot and forwards an averaged power value per measurement time slot to the connected baseband register 24, until the values for N measurement time slots are stored for the respective carrier. Thus, for each measurement time slot, a set of baseband power values $REF_1$ to $REF_N$ is stored distributed over the N baseband registers 24.

The signals output by the baseband modulators 1 are moreover processed either by digital-to-analogue converters 3, 4 and RF modulator 5, or by digital upconverter 12 and digital-to-analogue converter 14, depending on the base station transmitter employed, and, in both cases, by RF amplifier 7, summation unit 10 and MCPA 15, as described above.

The rms value of the power of the signals output by the MCPA 15 is detected by the power detector 20 and forwarded to the associated sampler 21. The sampler 21 averages the received power over one measurement time slot and stores in register 22 an averaged MCPA 15 output power value for each measurement time slot for which a set of averaged baseband power values is being stored in the baseband power registers 24. When at least N sets of baseband power values and the corresponding MCPA 15 output power values are stored in the registers 24, 22, the contents of the registers 22, 24 are fed to the device 25, which is able to solve a system of N equations with N unknowns. In case the base station transmitter is used in a TDMA system, the measurement time slots are advantageously synchronised with the carrier time slots.

Each power $P_0^{<m>}$ of an RF signal output by the MCPA 15 during a given measurement timeslot m is the sum of the amplified baseband reference powers during that timeslot, as expressed by the following equation:

$$P_0^{(m)} = REF_1^{(m)} \cdot G_1 + REF_2^{(m)} \cdot G_2 + \ldots + REF_N^{(m)} \cdot G_N,$$

$REF_i^{(m)}$ being the power of the $i^{th}$ (i=1 ... N) of N carriers averaged over the measurement time slot m at the output of the baseband modulator, and $G_i$ (i=1 ... N) being the to be estimated RF power gain for the $i^{th}$ carrier. Given N sets of baseband powers and N corresponding MCPA output powers stored in the registers, a system of N equations with N unknowns is obtained, from which the unknown RF gain $G_i$ for each carrier can be calculated. The device 25 that is able to solve matrix equations is used to solve this system of equations, providing as solution of the system of equations an estimated gain $G_i$ of the radio frequency path for each carrier.

The estimated gain $G_i$ is compared with a predetermined gain for each carrier by a dedicated summation element 26, in which the estimated gain $G_i$ is subtracted from the predetermined gain. The resulting difference is used by a controller 27 connected to the respective summation element 26 to control the gain for the respective carrier by adjusting the gain control signal $GC_i$ (i=1 to N) fed to the gain control input of the respective RF amplifier 7 accordingly.

In one preferred embodiment, the described procedure is applied regularly, in order to set the gain for each carrier accurately. In between, the total gain is determined by simply dividing the total output power by the sum of the input powers. The total gain is compared to a desired total gain and the difference is used to change the gain of all RF amplifiers 7 equally, as described as one possibility known from the state of the art. The setting of the gain according to the first method of the invention is carried out during low traffic hours by varying the carrier powers systematically. If dummy code channels are added during which the carrier powers are varied in a way that the matrix equation gets well conditioned, the individual RF gains can be solved with little error, while at the same time the data transmission is not influenced.

In a variation of the embodiment of FIG. 4, it is not the power of the baseband signals that is fed to the power detection and control unit 16, but rather the power of the signals input to the digital-to-analogue converters 14. The power of these signals can be determined either already within the digital upconverter 12 or at its output. The determination of the RF gains of the different carriers corresponds to the determination described with reference to FIGS. 4 and 5. In this case, however, the determined gain does not include the gain in the digital upconverter 12.

Figure 6:
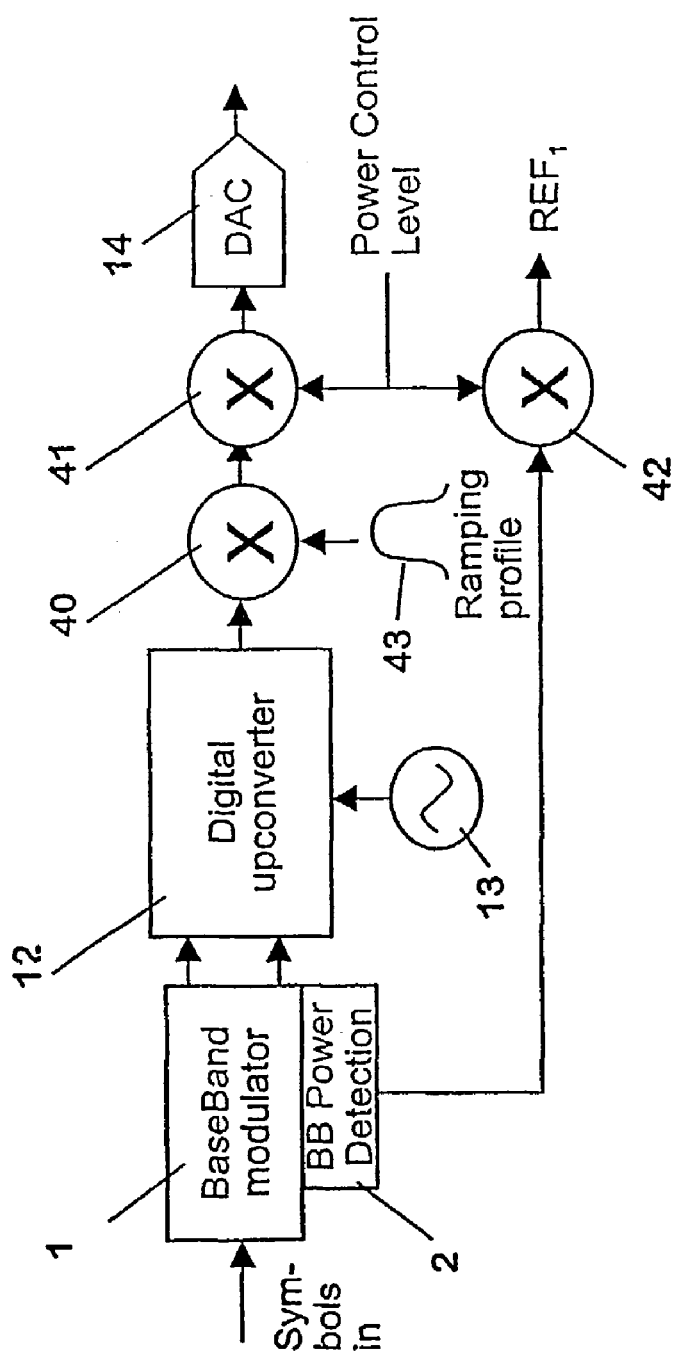
FIG. 6 shows a block diagram of a part of an alternative multi-carrier base station transmitter based on NCO modulation employed for the first alternative of the invention.

FIG. 6 illustrates a further variation of such a multi-carrier base station transmitter that can be employed as GSM multi-carrier base station transmitter, while the previous embodiments can be employed in particular for WCDMA. The multi-carrier base station transmitter corresponds to the transmitter of FIG. 4, except for modifications in the respective part between the baseband power detection unit 2 and the digital-to-analogue converter 14 in each single carrier unit. Therefore, only this part is shown, and only for the first carrier.

In the depicted single carrier unit, two multipliers 40, 41 are arranged between the digital upconverter 12 and the digital-to-analogue converter 14, the latter two being present also in FIG. 4. The output of the baseband power detection unit 2 is moreover connected to an input of a third multiplier 42. Further, a common source of a power control level signal is connected to an input of the second multiplier 41 and an input of the third multiplier 42, which is indicated in FIG. 6 by a double arrow between the second and the third multiplier 41, 42.

In operation, the first multiplier 40 multiplies the output of the digital upconverter 12 with a ramping profile signal 43. The ramping profile is used to separate the timeslots of the modulated carrier signal from each other. The resulting signal is then provided to an input of the second multiplier 41. The power control level signal, which is constant within a time slot and which corresponds to the needed transmitter output power in each individual time slot, is provided as second input signal to the second multiplier 41. Accordingly, the second multiplier 41 multiplies the ramped and modulated carrier signal received from the first multiplier 40 with the received power control level and forwards the result to the digital-to-analogue converter 14. The third multiplier 42, on the other hand, receives as first input signal the output power of the digital baseband modulator 1 via the baseband power detection unit 2 and as second input signal as well the power control level signal. The third multiplier 42 multiplies both received signals and outputs as result a reference power REF1.

Assuming that the gain of the digital upconverter times the peak value of the ramping profile is unity, i.e. the gain of the digital upconverter is compensated by the peak value of the ramping profile in the multiplication, the power $REF_1$, output by the third multiplier 42 is equal to the power input to the digital-to-analogue converter 14. The power $REF_1$ and the corresponding powers for the other carriers are then fed to the power detection and control unit 16, where they are used to determine the RF gain for the different carriers as described with reference to FIGS. 3 to 5.

Figure 7:
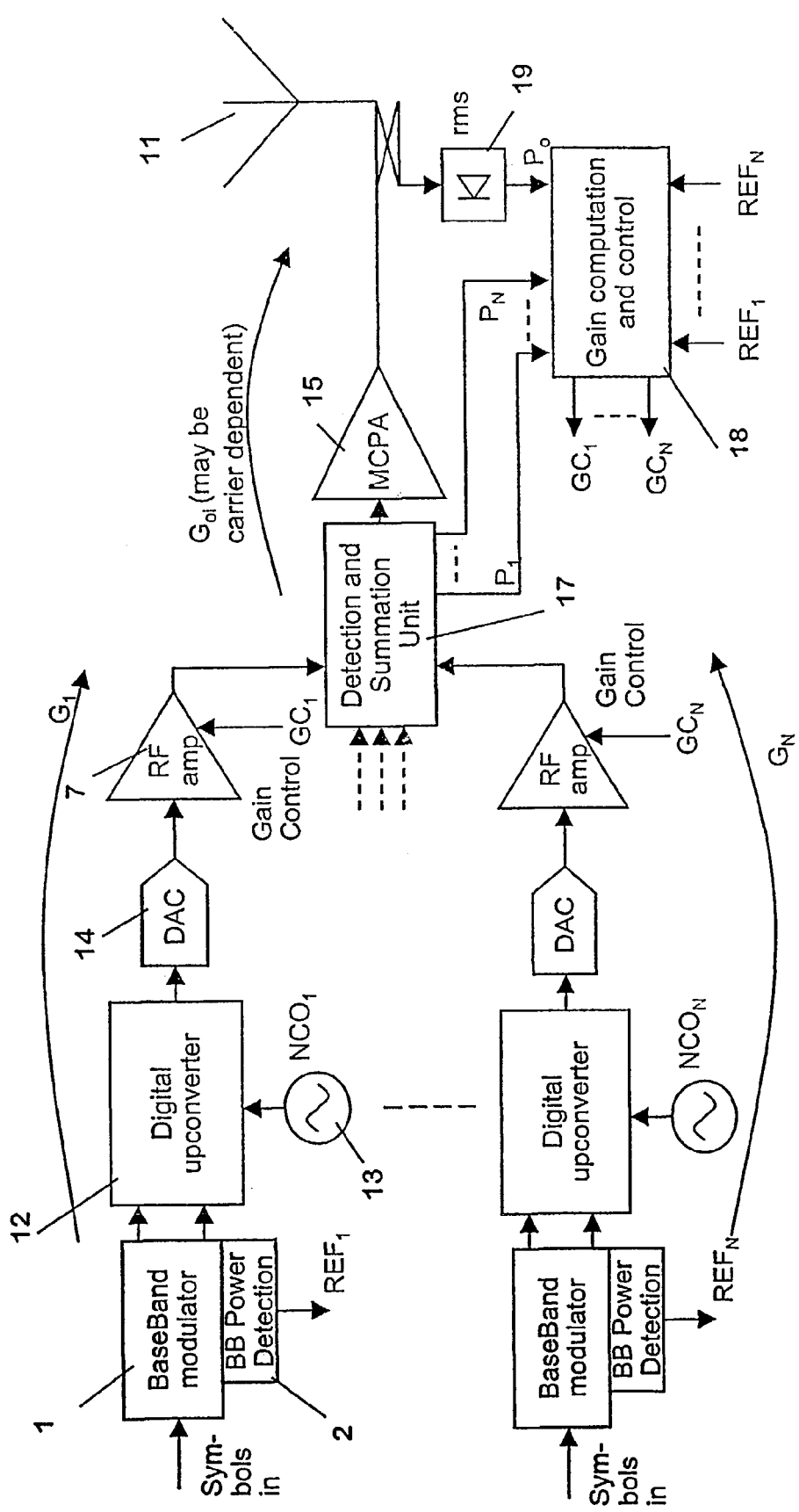
FIG. 7 shows a block diagram of a multi-carrier base station transmitter based on NCO modulation according to the second alternative of the invention.

FIG. 7 shows a block diagram of an embodiment of a multi-carrier base station transmitter based on NCO modulation that can be used according to the second alternative of the invention.

The base station transmitter comprises like the one in FIG. 4 a separate transmitter part for each of N carriers. Each of these separate transmitter parts includes a baseband modulator 1, a digital upconverter 12, a digital-to-analogue converter 14 and an RF amplifier 7. Again, in practice, the architecture will have more upconversion stages, amplifiers, filters, etc. The outputs of the RF amplifiers 7 are connected via a detection and summation unit 17 and an MCPA 15 to a transmit antenna 11. Further outputs of the detection and summation unit 17 are connected to the inputs of a gain computation and control unit 18. Additionally, the output of the MCPA 15 is connected via a rms power detector 19 to an input of the gain computation and control unit 18. Finally, a digital output of each baseband modulator 1 is connected via a baseband power detection unit 2 to an input of the gain computation and control unit 18. Each of the N outputs of the gain computation and control unit 18 is connected to the gain control input of one of the RF amplifiers 7 of the N separate transmitter part.

Figure 8:
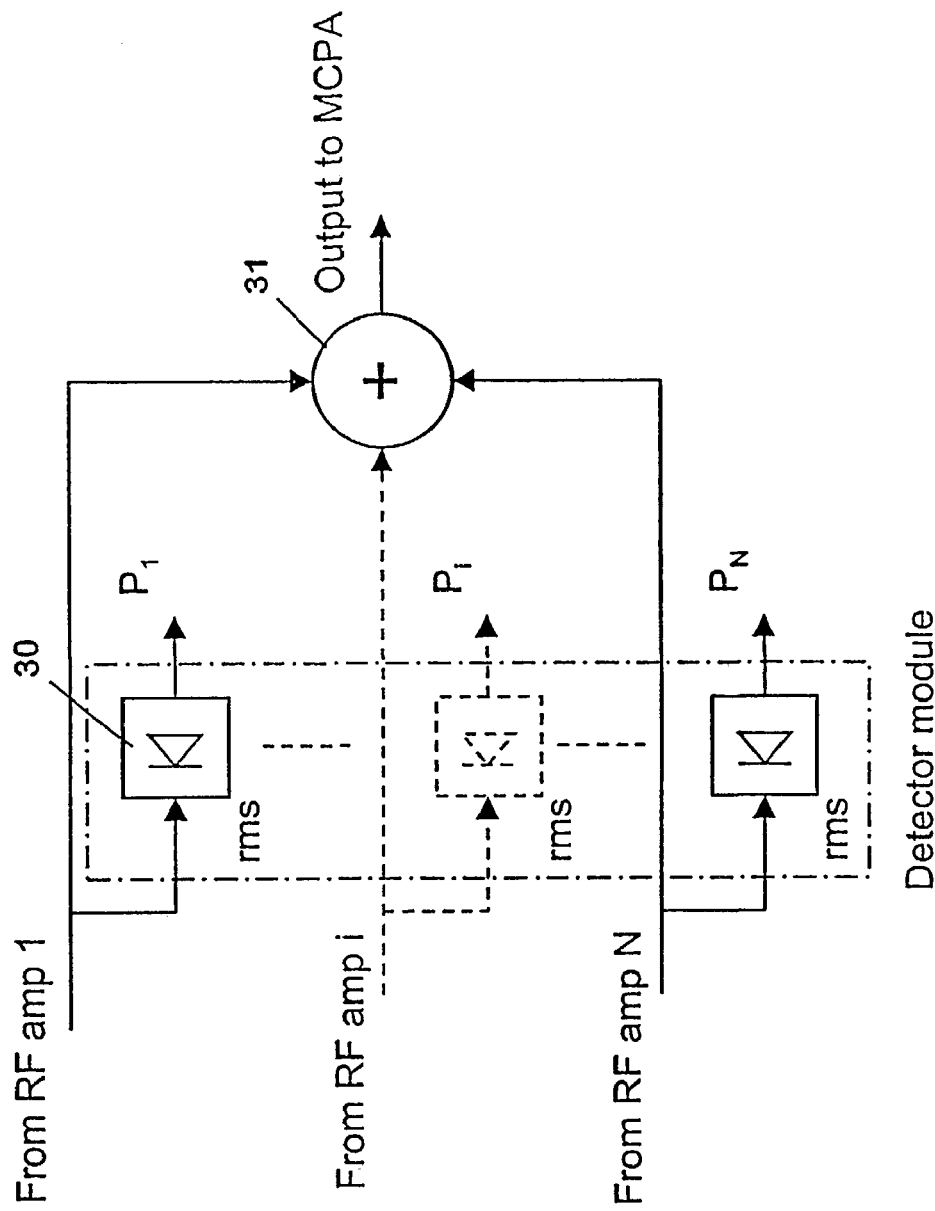
FIG. 8 schematically shows details of a detection and summation unit of the base station transmitter of FIG. 7.

FIG. 8 shows in more detail the detection and summation unit 17 of FIG. 7. The detection and summation unit 17 comprises a bank of detectors 30 in a single integrated circuit. However, the use of a single integrated circuit for the detectors 30 is only a preferred implementation. As an alternative, it would also be possible to use separate circuits for each detector. The input of each detector 30 is connected to the output of one of the RF amplifiers 7. The outputs of the detectors 30 are connected to inputs of the gain computation and control unit 18. Additionally, the detection and summation unit 17 comprises a summation element 31 via which the output of each RF amplifier 7 is connected to the input of the MCPA 15. The bank of detectors 30 of the detection and summation unit 17 could be located anywhere, but in order to minimise the cabling in the transmitter, the detectors are located where the single-carrier signals are brought together anyway, i.e. near the summing element 31 at the input of the MCPA 15.

The processing of symbols that are to be transmitted by the base station transmitter in baseband modulators 1, digital upconverters 12, digital-to-analogue converters 14 and RF amplifiers 7 corresponds to the processing described with reference to FIG. 4.

In contrast to the architecture in FIG. 4, however, the individual carrier powers are detected separately in the detection and summation unit 17 before the modulated carriers are summed by the summing element 31. The N detectors 30, each used for detecting the power $P_1$–$P_N$ of one of the N carriers, are well matched to each other in order to be able to track the power of each carrier in relation to the power of the other carriers accurately. The detected powers $P_1$–$P_N$ are fed to the gain computation and control unit 18 and the summed multi-carrier signal is forwarded to the MCPA 15 for power amplification.

The multi-carrier signal output by the MCPA 15 is forwarded on the one hand to the transmit antenna 11 for transmission.

On the other hand, the power $P_0$ of the multi-carrier signal is determined by the rms power detector 19. The detected power $P_0$ is input to the gain computation and control unit 18.

Moreover, the powers $REF_1$–$REF_N$ of the baseband signals output by the N baseband modulators 1 are determined in the baseband power detection unit 2 and input to the gain computation and control unit 18.

The gain computation and control unit 18 comprises a mathematical algorithm for estimating the individual RF gains of the different carriers out of the different power values $P_0$, $P_1$–$P_N$, $REF_1$–$REF_N$ received. All powers are averaged over the same measurement time slot before being used by the algorithm.

Because the measured powers $P_1$–$P_N$ determined by the detectors 30 have only a multiplicative error that is common for each carrier, their ratios have no error. Referencing the detected powers of the single-carrier signals arbitrarily to the power $P_1$ of the first carrier, the normalised output powers of the carrier are given by $$\frac{P_i}{P_1} = \frac{REF_i \cdot G_i}{REF_1 \cdot G_1},$$

where $P_i$ (i=1 ... N) is the power of the $i^{th}$ carrier determined by the respective detector 30, $REF_1$ (i=1 ... N) the power of the signal output by the $i^{th}$ baseband modulator 1 for modulation of the $i^{th}$ carrier, and $G_i$ (i=1 ... N) the RF gain of the $i^{th}$ carrier until the summation. Proceeding from the above equation, the gains normalised with the RF gain $G_1$ of the first carrier until summation are:

$$\frac{G_i}{G_1} = \frac{REF_1 \cdot P_i}{REF_1 \cdot P_1}$$

Moreover, the multi-carrier output power in a given measurement time slot $P_0$ is the sum of the amplified baseband powers and given by the equation:

$$P_0 = REF_1 \cdot G_1 \cdot G_{01} + REF_2 \cdot G_2 \cdot G_{02} + \ldots + REF_N \cdot G_N \cdot G_{0N}$$

The total amplification for the $i^{th}$ carrier in this equation is given by $G_i * G_{01}$ (i=1 ... N), with $G_{0i}$ being the RF power gain for the $i^{th}$ carrier in the summation element 31 of the detection and summation unit 17 and in the MCPA 15. The values of $G_{0i}$ are assumed to be known a priory apart from an unknown common factor. The latter equation can be rewritten as:

$$G_1 \cdot G_{01} = \frac{P_0}{REF_1 + REF_2 \cdot \frac{G_2}{G_1} \cdot \frac{G_{02}}{G_{01}} + \ldots + REF_2 \cdot \frac{G_N}{G_1} \cdot \frac{G_{0N}}{G_{01}}}$$

As shown above, the ratios $G_i/G_1$ are easily derived from the measured single-carrier RP powers $P_i$ and the baseband powers $REF_i$. The ratios $G_{0i}/G_{01}$ are assumed to be known a priori from the frequency response of the MCPA 15. Therefore, $G_1 * G_{01}$, which constitutes the gain of the $1^{st}$ RF path used by the $1^{st}$ carrier, can readily be solved from the above equation. The gain $G_i * G_{0i}$ of the $i^{th}$ RF path can be computed from the gain of the $1^{st}$ path, since the gain ratios are known. If the RF gains deviate from values predetermined for the gains, the gain computation and control unit 18 adjusts the gain control signals $GC_i$ (i=1 ... N) input to the RF amplifiers 7 in order to approach the estimated gains to the desired gains.

The base station transmitter of FIG. 7 is based on NCO modulation, which could also be varied for this embodiment of the second alternative of the invention according to FIG. 6. The second method according to the invention can moreover equally be employed for a base station transmitter based on RF IQ modulation as presented in FIG. 3.

Even though the described embodiments of the invention all proceed from a conventional base station transmitter based on RF IQ modulation or from a conventional base station transmitter based on NCO modulation, the features of the invention can be combined with any conceivable base station architecture. Also when proceeding from a base station transmitter based on RF IQ modulation or on NCO modulation, various amendments can be carried out without exceeding the scope of the invention.

What is claimed is:

1. A method for determining separate radio frequency gains for different carriers in a multi-carrier transmitter of a radio transmission unit of a radio communications system, the multi-carrier transmitter comprising means for modulating at least two different carriers with modulation signals, means for summing the modulated carriers output by the means for modulating, and a multi-carrier power amplifier for amplifying the summed modulated carriers for transmission, the method comprising:

determining power of the summed modulated carriers output by the multi-carrier power amplifier for at least as many different sets of powers ($REF_1$–$REF_N$) of signals modulated onto the different carriers as there are carriers; and evaluating the sets of powers ($REF_1$–$REF_N$) of signals used for modulation and corresponding powers of the summed modulated carriers output by the multi-carrier power amplifier to mathematically determine a radio frequency gain ($G_1$–$G_N$) between input signals to the means for modulating and the output of the multi-carrier power amplifier.

2. The method according to claim 1, wherein radio frequency gain ($G_1$–$G_N$) of each carrier is determined in accordance with a relationship:

$$P_0^{\langle m \rangle} = \sum_{i=1}^{N} REF_i^{\langle m \rangle} \cdot G_i$$

wherein <m> is a number of a respective set, $P_0$ is a power of the summed modulated carriers output by the multi-carrier power amplifier corresponding to the respective set, N is a total number of carriers, $REF_i$ is the power of the signal used for modulating an $i^{th}$ carrier in the respective set, and $G_i$ is the radio frequency gain to be determined for the $i^{th}$ carrier.

3. The method according to claim 1, wherein powers used for determining the radio frequency gain ($G_1$–$G_N$) of the summed modulated carriers correspond to the power of signals averaged over one measurement time slot.

4. The method according to claim 1, wherein signals of regular traffic with powers of signals varied according to transmission requirements are used to obtain powers of signals evaluated for determining the radio frequency gain ($G_1$–$G_N$) of the summed modulated carriers.

5. The method according to claim 1, wherein dedicated signals with intentionally varied powers are used to obtain powers of signals evaluated for determining the radio frequency gain ($G_1$–$G_N$) of the summed modulated carriers.

6. The method according to claim 1, wherein more sets of powers ($REF_1$–$REF_N$) and the corresponding powers of the summed modulated carriers are determined than carriers are provided by the means for modulating, for said evaluation a linear equation is set up for each set of powers ($REF_1$–$REF_N$) and the corresponding power of the summed modulated carriers with the radio frequency gains ($G_1$–$G_N$) as unknown values, and a maximum likelihood method is used to determine gains that provide a best equation fit.

7. The method according to claim 1, wherein a characteristic of a detector used to determine the output power of the multi-carrier power amplifier is linearised around an operating point.

8. The method according to claim 1, wherein the output power of the multi-carrier power amplifier is determined by downconverting a radio frequency signal output by the multi-carrier power amplifier and by converting it to a digital domain, in which the output power is determined.

9. The method according to claim 1, wherein means for downconversion and an analogue-to-digital conversion block integrated in the multi-carrier power amplifier for monitoring and controlling linearisation performance detects a power of a signal output by the multi-carrier power amplifier.

10. The method according to claim 1, further comprising:
comparing the determined radio frequency gains ($G_1$–$G_N$) with predetermined gain values for each carrier; and
adjusting radio frequency gains accordingly for each carrier to control the radio frequency gains of the at least two different carriers.

11. The method according to claim 1, further comprising:
dividing the power of the summed modulated carriers output from the multi-carrier power amplifier by a sum of the powers of a single set of powers to determine a total gain of the at least two different carriers; and
adjusting equally the gain of the summed modulated carriers for all carriers according to the determined total gain of the at least two different carriers;
wherein gains ($G_1$–$G_N$) of the at least two different carriers are occasionally determined and used for individual adjustments of the gains of the at least two different carriers, while during a remaining time, the total gain of the at least two different carriers is determined.

12. The method according to claim 1, wherein said means for modulating at least two different carriers with modulation signals modulate said at least two different carriers in a digital domain, a power of said digital modulated carriers is multiplied with a respective power control level, digital-to-analogue converters convert each power adjusted digital modulated at least two different carriers into analogue modulated carriers, said means for summing sums the analogue modulated carriers output by the digital-to-analogue converters, and each power in said sets of powers is multiplied with the power control level which is applied to a respective digital modulated at least two different carriers prior to being used in said evaluation, which digital modulated at least two different carriers have been modulated with a modulating signal to which the respective power in said sets of powers is associated.

13. A method for determining separate radio frequency gains for different carriers in a multi-carrier transmitter of a radio transmission unit of a radio communications system, the multi-carrier transmitter comprising means for modulating at least two different carriers with modulation signals in a digital domain, digital-to-analogue converters for converting each of the digital modulated at least two different carriers into analogue modulated carriers, means for summing the analogue modulated carriers output by the digital-to analogue converters, and a multi-carrier power amplifier for amplifying the summed carriers for transmission, the method comprising:
determining power of the summed carriers output by the multi-carrier power amplifier for at least as many different sets of powers of signals input to the digital-to-analogue converters as there are carriers; and
evaluating the sets of powers of the signals input to the digital-to-analogue converters and the corresponding powers of the summed carriers output by the multi-carrier power amplifier to mathematically determine a radio frequency gain between the input of the digital-to-analogue converters and the output of the multi-carrier power amplifier for each of the at least two different carriers.

14. The method according to claim 13, wherein the radio frequency gain ($G_1$–$G_N$) of each carrier is determined in accordance with the relationship:

$$P_0^{\langle m \rangle} = \sum_{i=1}^{N} REF_i^{\langle m \rangle} \cdot G_i$$

wherein <m> is a number of a respective set, $P_0$ is a power of the summed carriers output by the multi-carrier power amplifier corresponding to the respective set, N is a total number of carriers, $REF_i$ is the power of the signal input to the digital to-analogue converters employed for an $i^{th}$ carrier in the respective set, and $G_j$ is the radio frequency gain to be determined for the $i^{th}$ carrier.

15. The method according to claim 13, wherein powers used for determining the radio frequency gain ($G_1$–$G_N$) of the at least two different carriers correspond to the power of signals averaged over one measurement time slot.

16. The method according to claim 13, wherein the signals of regular traffic with powers of signals varied according to transmission requirements are used to obtain the powers of signals evaluated for determining the radio frequency gain ($G_1$–$G_N$) of the at least two different carriers.

17. The method according to claim 13, wherein dedicated signals wit intentionally varied powers are used to obtain the powers of signals evaluated for determining the radio frequency gain (($G_1$–$G_N$) of the at least two different carriers.

18. The method according to claim 13, wherein more sets of powers ($REF_1$–$REF_N$) and the corresponding powers of the summed carriers are determined than carriers are provided by the means for modulating, for said evaluation a linear equation is set up for each set of powers ($REF_1$–$REF_N$) and the corresponding power of the summed carriers with the radio frequency gains ($G_1$–$G_N$) as unknown values, and a maximum likelihood method is used to determine gains that provide a best equation fit.

19. The method according to claim 13, wherein a characteristic of a detector used to determine the output power of the multi-carrier power amplifier is linearised around an operating point.

20. The method according to claim 13, wherein the output power of the multi-carrier power amplifier is determined by downconverting a radio frequency signal output by the multi-carrier power amplifier and by converting it to a digital domain, in which the output power is determined.

21. The method according to claim 13, wherein means for downconversion and an analogue-to-digital conversion block integrated in the multi-carrier power amplifier for monitoring and controlling linearisation performance is used to detect the power of a signal output by the multi-carrier power amplifier.

22. The method according to claim 13, further comprising:
comparing the determined radio frequency gains ($G_1$–$G_N$) with predetermined gain values for each of the at least two carriers; and
adjusting radio frequency gains accordingly for each of the at least two carriers to control the radio frequency gains.

23. The method according to claim 13, further comprising:
dividing the power of the summed carriers output from the multi-carrier power amplifier by a sum of the powers of a single set of powers to determine a total gain of the at least two different carriers; and
adjusting equally the gain of the summed carriers according to the determined total gain of the at least two different carriers;
wherein the gains ($G_1$–$G_N$) of the at least two different carriers are occasionally determined and used for individual adjustments of the gains of the at least two different carriers, while during a remaining time, the total gain of the at least two different carriers is determined.

24. A method for determining separate radio frequency gains for different carriers in a multi-carrier transmitter of a radio transmission unit of a radio communications system, the multi-carrier transmitter comprising means for modulating at least two different carriers with modulation signals, means for summing the modulated at least two different carriers output by the means for modulating, and a multi-carrier power amplifier for amplifying the summed at least two carriers for transmission, the method comprising:
determining powers ($P_1$–$P_N$) of the modulated at least two different carriers input to the means for summing separately for each of the at least two different carriers; and
evaluating a distribution of the determined powers ($P_1$–$P_N$) of the modulated at least two different carriers to determine a contribution of the at least two different carriers to a total power ($P_0$) of the summed at least two different carriers output by the multi-carrier power amplifier for determining the radio frequency gains ($G_1G_{01}$–$G_NG_{0N}$) for the at least two different carriers.

25. The method according to claim 24, wherein the radio frequency gains ($G_1G_{01}$–$G_NG_{0N}$) for the at least two different carriers are determined by dividing the contribution of a respective carrier to the total power by the power of a signal used for modulating the respective carrier.

26. The method according to claim 24, wherein the multi-carrier transmitter comprises a digital-to-analogue converter for converting the modulated at least two different carriers into an analogue domain prior to being summed by the means for summing, and the radio frequency gains ($G_1G_{01}$–$G_NG_{0N}$) for the at least two different carriers are determined by dividing the contribution of a respective carrier to the total power by the power of a signal input to the digital-to-analogue converter employed for the respective carrier.

27. The method according to claim 24, wherein a characteristic of a detector for determining the output power ($P_0$) of the multi-carrier power amplifier is linearised around an operating point.

28. The method according to claim 24, wherein the output power ($P_0$) of the multi-carrier power amplifier is determined by downconverting a radio frequency signal output by the multi-carrier power amplifier and by converting it to a digital domain, in which the output power is determined.

29. The method according to claim 24, wherein means for downconversion and an analogue-to-digital conversion block integrated in the multi-carrier power amplifier for monitoring and controlling linearisation performance is used to detect the power ($P_0$) of a signal output by the multi-carrier power amplifier.

30. The method according to claim 24, further comprising:
comparing the determined radio frequency gains ($G_1$–$G_N$) with predetermined gain values for each of the at least two different carriers; and
adjusting the radio frequency gains accordingly for each of the at least two different carriers to control the radio frequency gains of the at least two different carriers.

31. The method according to claim 24, further comprising:
dividing the power of the summed carriers output by the multi-carrier power amplifier by the sum of the powers of a single set of powers to determine a total gain of the at least two different carriers; and
adjusting equally the gain of the carriers for all carriers according to the determined total gain of the different carriers;
wherein gains ($G_1$–$G_N$) of the at least two different carriers are occasionally determined and used for individual adjustments of the gains of the at least two different carriers, while during a remainder of time, the total gain of the different carriers is determined.

32. A radio transmission unit for a radio communications network, comprising:
a multi-carrier transmitter comprising:
means for modulating at least two different carriers with modulation signals,
means for summing the modulated at least two different carriers output by the means for modulating, and
a multi-carrier power amplifier for amplifying the summed at least two different carriers for transmission; and
power detection and control means receiving as input at least as many sets of powers ($REF_1$–$REF_N$) of signals used for modulating the at least two different carriers there are carriers provided by the means for modulating;
wherein for each set of powers a corresponding power of the summed at least two different carriers is output by the multi-carrier power amplifier, and the power detection and control means is configured to mathematically determine from the received at least as many sets of powers a radio frequency gain in the multi-carrier transmitter for each of the at least two different carriers.

33. The radio transmission unit according to claim 32, wherein the power detection and control means comprise registers for storing powers of each set of powers ($REF_1$–$REF_N$) of the signals used for modulating the at least two different carriers and a corresponding total output power of the multi-carrier power amplifier used for determining radio frequency gains ($G_1$–$G_N$).

34. The radio transmission unit according to claim 32, wherein the power detection and control means comprise a device configured to mathematically solve matrix equations for determining radio frequency gains ($G_1$–$G_N$), said device receiving as input the sets of powers ($REF_1$–$REF_N$) of the signals used for modulating the at least two different carriers and corresponding powers of the summed at least two different carriers output by the multi-carrier power amplifier, and outputting an estimated radio frequency gain ($G_1$–$G_N$) for each of the at least two different carriers.

35. The radio transmission unit according to claim 32, wherein signals input to the means for modulating are provided by a separate baseband modulator for each of the at least two different carriers outputting digital in-phase and digital quadrature components corresponding to received data symbols and connected to means for baseband power detection providing the powers ($REF_1$–$REF_N$) of output signals to the power detection and control means, the means for modulating comprise for each of the at least two different carriers two digital-to-analogue converters for converting digital in-phase and quadrature components received from the baseband modulator for a respective carrier into analogue in-phase and quadrature components (I,Q), a radio frequency modulator for modulating a carrier received from a local oscillator with the analogue in-phase and quadrature components (I,Q) output by the digital-to-analogue converters, and a radio frequency amplifier having a gain which can be controlled for at least one carrier by the power detection and control means.

36. The radio transmission unit according to claim 32, wherein signals input to the means for modulating are provided by a separate baseband modulator for each of the at least two different carriers outputting digital in-phase and digital quadrature components corresponding to received data symbols and connected to means for baseband power detection providing the powers ($REF_1$–$REF_N$) of output signals to the power detection and control means, the means for modulating carriers comprise for each of the at least two different carriers at least one digital upconverter connected to a numerically controlled oscillator for upconverting the digital in-phase and digital quadrature components output by the baseband modulator for a respective carrier to a frequency of the respective carrier provided by the numeric oscillator, a digital-to-analogue converter for converting an output of the upconverter into an analogue signal, and a radio frequency amplifier for amplifying a signal output by the digital-to-analogue converter, the radio frequency amplifier having a gain which can be controlled for at least one carrier by the power detection and control means.

37. The radio transmission unit according to claim 32, wherein a storage of measured powers and radio frequency gain estimations are implemented in software.

38. The radio transmission unit according to claim 32, wherein means for downconversion and an analogue-to-digital conversion block are integrated in the multi-carrier power amplifier for monitoring and controlling linearisation performance, and said means for downconversion and said analogue-to-digital conversion block are used to detect the power of the summed at least two different carriers amplified by the multi-carrier power amplifier.

39. A module for a radio transmission unit of a radio communications system comprising the power detection and control means according to claim 32.

40. A radio communications network comprising a radio transmission unit according to claim 32.

41. A radio transmission unit for a radio communications network, comprising:
a multi-carrier transmitter comprising:
means for modulating at least two different carriers with modulation signals in a digital domain;
digital-to analogue converters for converting each of the digital modulated at least two different carriers into analogue modulated carriers;
means for summing the analogue modulated carriers output by the digital-to-analogue converters, and
a multi-carrier power amplifier for amplifying the summed modulated carriers for transmission; and
power detection and control means receiving as input at least as many sets of powers of signals input to the digital-to-analogue converters as there are carriers;
wherein for each set of powers a corresponding power of the summed modulated carriers output by the multi-carrier power amplifier, and the power detection and control means is configured to mathematically determine from the received at least as many sets of powers a radio frequency gain in the multi-carrier transmitter for each of the at least two different carriers.

42. The radio transmission unit according to claim 41, wherein the power detection and control means comprise registers for storing powers of each set of powers ($REF_1$–$REF_N$) of signals input to the digital to-analogue converters and a corresponding total output power of the multi-carrier power amplifier is used for determining radio frequency gains ($G_1$–$G_N$).

43. The radio transmission unit according to claim 41, wherein the power detection and control means comprise a device configured to mathematically solve matrix equations for determining radio frequency gains ($G_1$–$G_N$), the device receiving as an input the sets of powers ($REF_1$–$REF_N$) of the signals input to the digital-to-analogue converters and corresponding powers of the summed modulated carriers output by the multi-carrier power amplifier, and outputting an estimated radio frequency gain ($G_1$–$G_N$) for each of the at least two different carriers.

44. The radio transmission unit according to claim 41, wherein storage of measured powers and radio frequency gain estimations are implemented in software.

45. The radio transmission unit according to claim 41, wherein means for downconversion and an analogue-to-digital conversion block are integrated in the multi-carrier power amplifier for monitoring and controlling linearisation performance, and said means for downconversion and said analogue-to-digital conversion block are used to detect the power of the summed modulated carriers amplified by the multi-carrier power amplifier.

46. A module for a radio transmission unit of a radio communications system comprising the power detection and control means according to claim 41.

47. A radio communications network comprising a radio transmission unit according to claim 41.

48. A radio transmission unit for a radio communications network, comprising:
 a multi-carrier transmitter comprising:
  means for modulating at least two different carriers with modulation signals;
  means for summing the modulated at least two different carriers output by the means for modulating; and
  a multi-carrier power amplifier for amplifying the summed modulated carriers for transmission; and
 gain computation and control means receiving as input values a power ($P_0$) of the summed modulated carriers output by the multi-carrier power amplifier;
 wherein for each carrier a power ($P_1$–$P_N$) of the modulated at least two different carriers is separately fed by the means for modulating to the means for summing, and powers ($REF_1$$REF_N$) of signals used for modulating the at least two different carriers, the gain computation and control means is configured to evaluate a distribution of powers of signals input to the means for summing over the at least two different carriers for determining a contribution of the at least two different carriers to the power ($P_0$) of the summed modulated carriers output by the multi-carrier power amplifier for determining radio frequency gains ($G_1G_{01}$–$G_NG_{0N}$) for the at least two different carriers.

49. The radio transmission unit according to claim 48, wherein signals input to the means for modulating are provided by a separate baseband modulator for each of the at least two different carriers outputting digital in-phase and digital quadrature components corresponding to received data symbols and connected to means for baseband power detection providing powers of output signals to the power detection and control means, the means for modulating comprise for each of the at least two different carriers two digital-to analogue converters for converting digital in-phase and quadrature components received from the baseband modulator for a respective carrier into analogue in phase and quadrature components, a radio frequency modulator for modulating a carrier received from a local oscillator with the digital in-phase and quadrature components output by the digital-to analogue converters, and a radio frequency amplifier for amplifying the modulated carrier, the radio frequency amplifier having a gain which can be controlled for at least one carrier by a gain computation and control means.

50. The radio transmission unit according to claim 48, wherein signals input to the means for modulating are provided by a separate baseband modulator for each of the at least two different carriers outputting digital in-phase and digital quadrature components corresponding to received data symbols and connected to means for baseband power detection providing the powers ($REF_1$–$REF_N$) of output signals to the gain computation and control means, the means for modulating carriers comprise for each of the at least two different carriers at least one digital upconverter connected to a numeric oscillator for upconverting the digital in-phase and digital quadrature components output by the baseband modulator for a respective carrier to a frequency of the respective carrier provided by the numeric oscillator, a digital-to-analogue converter for converting an output of the upconverter into an analogue signal, and a radio frequency amplifier for amplifying the signal output by the digital-to analogue converter, the radio frequency amplifier having a gain which can be controlled for at least one carrier by the gain computation and control means.

51. The radio transmission unit according to claim 48, further comprising means for detecting the powers ($P_1$–$P_N$) of the modulated at least two different carriers fed to the means for summing, said means for detecting the powers ($P_1$–$P_N$) being a single radio frequency integrated circuit.

52. The radio transmission unit according to claim 48, further comprising means for detecting the powers ($P_1$–$P_N$) of the modulated at least two different carriers fed to the means for summing, said means for detecting the powers ($P_1$–$P_N$) including at least one dedicated radio frequency active component for each of the at least two different carriers;
 wherein corresponding dedicated active components employed for the at least two different carriers are matched components.

53. The radio transmission unit according to claim 48, wherein means for downconversion and an analogue-to-digital conversion block are integrated in the multi-carrier power amplifier for monitoring and controlling linearisation performance, and said means for downconversion and said analogue-to-digital conversion black are used to detect the power ($P_0$) of the summed modulated carriers amplified by the multi-carrier power amplifier.

54. The radio transmission unit according to claim 48, wherein radio frequency gain estimation is implemented in software.

55. A module for a radio transmission unit of a radio communications system comprising the gain computation and control means according to claim 48.

56. A module for a radio transmission unit of a radio communications system comprising means for separately detecting for each of the at least two different carriers the power of the summed modulated carriers fed to the means for summing according to claim 48.

57. A radio communications network comprising a radio transmission unit according to claim 48.

58. A radio transmission unit for a radio communications network, comprising:
 a multi-carrier transmitter comprising:
  means for modulating at least two different carriers with modulation signals in a digital domain; p2 digital-to analogue converters for converting each of the digital modulated at least two different carriers into analogue modulated carriers;
  means for summing the analogue modulated at least two different carriers output by the digital-to-analogue converters; and
  a multi-carrier power amplifier for amplifying the summed carriers for transmission; and gain computation and control means receiving as input values a power ($P_O$) of the summed modulated carriers output by the multi-carrier power amplifier;

wherein for each the at least two different carriers a power ($P_1$–$P_N$) of the analogue modulated carriers is separately fed by the digital-to-analogue converters to the means for summing and powers of signals input to the digital-to analogue converters, the gain computation and control means is configured to evaluate a distribution of powers of signals input to the means for summing over the at least two different carriers for determining a contribution of the at least two different carriers to the power ($P_O$) of the summed modulated carriers output by the multi-carrier power amplifier for determining radio frequency gains ($G_1G_{O1}$–$G_{ON}$) for the at least two different carriers.

59. The radio transmission unit according to claim 58, further comprising means for detecting the power (P1–$P_N$) of the modulated carriers fed to the means for summing, said means for detecting the power ($P_1$–$P_N$) being a single radio frequency integrated circuit.

60. The radio transmission unit according to claim 58, further comprising means for detecting the power ($P_1$–$P_N$) of the analogue modulated carriers fed to the means for summing, said means for detecting the power ($P_1$–$P_N$) including at least one dedicated radio frequency active component for each of the at least two different carriers;

wherein corresponding dedicated active components employed for different carriers are matched components.

61. The radio transmission unit according to claim 58, wherein means for downconversion and an analogue-to-digital conversion block are integrated in the multi-carrier power amplifier for monitoring and controlling linearisation performance, said means for downconversion and said analogue-to-digital conversion block are used to detect the power ($P_O$) of the summed at least two different carriers amplified by the multi-carrier power amplifier.

62. The radio transmission unit according to claim 58, wherein radio frequency gain estimations are implemented in software.

63. A module for a radio transmission unit of a radio communications system comprising the gain computation and control means according to claim 58.

64. A module for a radio transmission unit of a radio communications system comprising means for separately detecting for each of the at least two different carriers the power of the modulated carriers fed to the means for summing according to claim 58.

65. A radio communications network comprising a radio transmission unit according to claim 58.

* * * * *